United States Patent
Tankard

(10) Patent No.: US 6,628,105 B1
(45) Date of Patent: Sep. 30, 2003

(54) OPERATION OF SWITCHED RELUCTANCE DRIVE SYSTEMS FROM DUAL VOLTAGE SOURCES

(75) Inventor: Michael Paul Tankard, Harrogate (GB)

(73) Assignee: Switched Reluctance Drives Ltd., Harrogate (GB)

( * ) Notice: Subject to any disclaimer, the term of this patent is extended or adjusted under 35 U.S.C. 154(b) by 16 days.

(21) Appl. No.: 09/990,136

(22) Filed: Nov. 21, 2001

(30) Foreign Application Priority Data

Nov. 23, 2000 (GB) .............................................. 0028602

(51) Int. Cl.$^7$ ................................................ H02P 1/46
(52) U.S. Cl. ............................ 322/94; 322/89; 318/701
(58) Field of Search ............................. 322/59, 89, 94; 318/701, 696

(56) References Cited

U.S. PATENT DOCUMENTS

| | | | |
|---|---|---|---|
| 4,348,619 A | 9/1982 | Ray et al. | 318/139 |
| 4,969,229 A | 11/1990 | Svanberg et al. | 15/339 |
| 5,381,081 A | 1/1995 | Radun | 322/94 |
| 5,703,456 A | 12/1997 | Cox | 318/701 |
| 5,705,918 A | 1/1998 | Davis | 322/94 |
| 5,838,127 A * | 11/1998 | Young et al. | 318/293 |
| 5,870,292 A * | 2/1999 | Lipo et al. | 363/37 |
| 5,945,801 A * | 8/1999 | Yamada et al. | 318/701 |
| 6,087,799 A * | 7/2000 | Turner | 318/701 |
| 6,201,368 B1 * | 3/2001 | Webster | 318/729 |
| 6,297,613 B1 * | 10/2001 | Elliott et al. | 318/701 |
| 6,307,345 B1 * | 10/2001 | Lewis | 318/696 |
| 6,388,417 B1 * | 5/2002 | Keith | 318/701 |
| 6,495,985 B1 * | 12/2002 | Mayes et al. | 318/701 |

FOREIGN PATENT DOCUMENTS

| | | |
|---|---|---|
| EP | 0178615 A2 | 4/1986 |
| EP | 0564067 A2 | 10/1993 |
| EP | 1067668 A2 | 5/2000 |
| EP | 1039625 A2 | 9/2000 |

OTHER PUBLICATIONS

Kwon et al., "Computation of Optimal Excitation of a Switched Reluctance Motor Using Variable Voltage," Department of Electrical Engineering, Pusan National University, Korea, IEEE, 1996 pp. 84–89.

Database WPI, Section E1, Week 9008, Derwent Publications, Ltd., London, GB, XP002193657, Feb. 1, 1990, abstract.

Stephenson, et al., "The Characteristics, Design and Applications of Switched Reluctance Motors and Drives," PCIM '93, Nürnberg, Germany, Conference & Exhibition, Jun. 21–24, 1993 pp. 1–68.

* cited by examiner

*Primary Examiner*—Nicholas Ponomarenko
(74) *Attorney, Agent, or Firm*—Dicke, Billig & Czaja, PLLC

(57) ABSTRACT

A switched reluctance drive is supplied from a first voltage source (V1) during an idle period, in which it transfers energy to a second voltage source (V2). The machine is subsequently run at high power from the second source (V2), so that the first source (V1) does not have to supply the current required when the machine is operating at high power. The drive is able to regulate the amount of energy transferred to the second source (V2).

24 Claims, 5 Drawing Sheets

OPERATION OF SWITCHED RELUCTANCE DRIVE SYSTEMS FROM DUAL VOLTAGE SOURCES

CROSS-REFERENCE TO RELATED APPLICATION

The subject matter of this application is related to the subject matter of British Patent Application No. GB 0028602.1, priority to which is claimed under 35 U.S.C. § 119 and which is incorporated herein by reference.

BACKGROUND OF THE INVENTION

1. Field of the Invention

This invention relates to switched reluctance drive systems. In particular, it relates to such systems operated with a limited duty cycle on a supply system with a limited capacity.

2. Description of Related Art

The characteristics and operation of switched reluctance systems are well known in the art and are described in, for example, "The Characteristics, Design and Application of Switched Reluctance Motors and Drives" by Stephenson and Blake, PCIM'93, Nürnberg, Jun. 21–24, 1993, incorporated herein by reference. FIG. 1 shows a typical switched reluctance drive in schematic form, where the switched reluctance motor 12 drives a load 19. The input DC power supply 11 can be either a battery or rectified and filtered AC mains. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive. To this end, a rotor position detector 15 is typically employed to supply signals corresponding to the angular position of the rotor. The rotor position detector 15 may take many forms, including that of a software algorithm, and its output may also be used to generate a speed feedback signal.

Many different power converter topologies are known, several of which are discussed in the Stephenson paper cited above. FIG. 2 shows one of the most common configurations for a single phase of a polyphase system in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current"), which cannot be drawn from or returned to the supply. In practice, the capacitor 25 may comprise several capacitors connected in series and/or parallel and, where parallel connection is used, some of the elements may be distributed throughout the converter.

FIG. 3 shows typical waveforms for an operating cycle of the circuit shown in FIG. 2. FIG. 3(a) shows the voltage being applied for the duration of the conduction angle $\theta_c$ when the switches 21 and 22 are closed. FIG. 3(b) shows the current in the phase winding 16 rising to a peak and then falling slightly. At the end of the conduction period, the switches are opened and the current transfers to the diodes, placing the inverted link voltage across the winding and hence forcing down the flux and the current to zero. At zero current, the diodes cease to conduct and the circuit is inactive until the start of a subsequent conduction period. The current on the DC link reverses when the switches are opened, as shown in FIG. 3(c), and the returned current represents energy being returned to the supply. This ability of a switched reluctance machine to allow energy to be returned to a supply circuit has advantages. For example, U.S. Pat. No. 5,705,918, incorporated herein by reference, discloses a generator that can transfer energy from a high-voltage bus to a low-voltage bus in order to increase generating efficiency.

The shape of the current waveform of a switched reluctance drive varies depending on the operating point of the machine and on the switching strategy adopted. As is well-known and described in, for example, the Stephenson paper cited above, low-speed operation generally involves the use of current chopping to contain the peak currents, and switching off the switches non-simultaneously gives an operating mode generally known as "freewheeling".

Switched reluctance drives are typically driven from the mains electricity supply. Some drives, however, do not have a fixed connection to the public electricity supply because they are installed on, for example, marine or automotive equipment. In these situations, the system is typically supplied by an alternator that is driven by a fossil-fuel-fired prime mover. A storage battery is usually provided to store sufficient energy to start the prime mover and to supply loads in excess of the generator capacity. It is re-charged by the alternator when there is sufficient generated capacity above that demanded by the system load.

With the alternator/storage battery systems described above, there is inevitably a compromise between capital cost, weight and performance. While the designer wishes to have a system capable of supplying any or all loads without the voltage on the system dropping, this can only be done by increasing the capacity of the battery and/or the alternator. This increases the capital cost of the system and the weight, which in turn leads to increased running cost and/or reduced dynamic performance from the boat or vehicle. A particular problem arises when a large load is intermittently operated, especially when the system is already supplying other loads that are sensitive to voltage fluctuations. For example, vehicle or cabin lighting using incandescent filaments is a load that is well-known to be sensitive to voltage fluctuations and indeed it is common for a slight dimming to occur when another load is switched onto the same supply bus. Where the load has a duty cycle of, say several seconds on followed by some tens of seconds off, this can be irritating to the eye.

There is therefore a need for a method of intermittently operating a drive on a limited capacity bus without causing significant voltage disturbance.

SUMMARY OF THE INVENTION

According to a first aspect of the invention, there is provided a switched reluctance drive comprising: a rotor, a stator having a winding, and a controller having means for selectively connecting either of a first and/or a second voltage source to supply the winding, and an energy return path between the winding and the second voltage source to allow returned energy to be transferred from the winding to the second voltage source when the first voltage source is used to supply the winding, thereby to charge the second voltage source.

An advantage of this drive is that energy is transferred from the winding to charge up a second voltage source for intermittent use.

The second voltage source may be greater than the first voltage source. Preferably, the second voltage source is charged up to a predetermined value, for example, two or three times that of the first voltage source.

The first and second voltage sources may be connected in series or in parallel. The first and second voltage sources may each include a capacitor connected across it in parallel.

The energy return path may comprise a diode that is connected between one end of the winding and the second voltage source in such a way as to transfer energy from the winding to the second voltage source.

The means for selectively connecting either of the first and/or the second voltage sources to supply the winding may comprise a pair of switches arranged in parallel, the first switch being connected between the winding and the first voltage source and the second switch being connected between the winding and the second voltage source, so that when the first switch is opened and the second switch is closed, the second voltage source can be used to supply the winding. A third switch may be provided for connecting the winding to a common terminal of both of the first and second voltage sources.

The means for selectively connecting either of the first and/or the second voltage sources to supply the winding may comprise a change-over switch that is operable in one position to connect the first voltage source to supply the winding and in another position to connect the second voltage source to supply the winding. The winding may be connected between and in series with a pair of switches.

According to another aspect of the invention, there is provided a method of operating a switched reluctance drive comprising a rotor and a stator having a winding, the method comprising: connecting a first voltage source to the drive so as to supply the winding; switching the first voltage source on and off across the winding; transferring energy from the winding when the first voltage source is switched off to a second voltage source, thereby to charge the second voltage source, and selectively connecting the second voltage source so as to supply the winding.

Preferably, the step of transferring is conducted until the second voltage source is charged up to a predetermined value, preferably higher than the voltage rating of the first voltage source, for example, two or three times that of the first voltage source.

The first and second voltage sources may be connected in series or in parallel. The first and second voltage sources may each include a capacitor connected across it in parallel.

The step of transferring may involve directing energy from the winding to the second voltage source via an energy return path that comprises a diode that is connected between one end of the winding and the second voltage source in such a way as to transfer energy from the winding to the second voltage source.

The winding may be connected in series with and between a pair of switches and the step of switching may involve switching the pair of switches between open and closed positions.

The method may further involve detecting when the second voltage source is charged to a predetermined level. Preferably, the method involves modifying the step of switching to reduce the energy returned to the second voltage source when it is charged to the predetermined level.

BRIEF DESCRIPTION OF THE DRAWINGS

Several embodiments of the invention will now be described by way of example only, with reference to the accompanying drawings, of which:

FIG. 3(*b*) shows a phase current waveform corresponding to FIG. 3(*a*);

FIG. 3(*c*) shows a converter supply current waveform corresponding to FIG. 3(*b*);

DETAILED DESCRIPTION OF PREFERRED EMBODIMENTS

Figure 4:
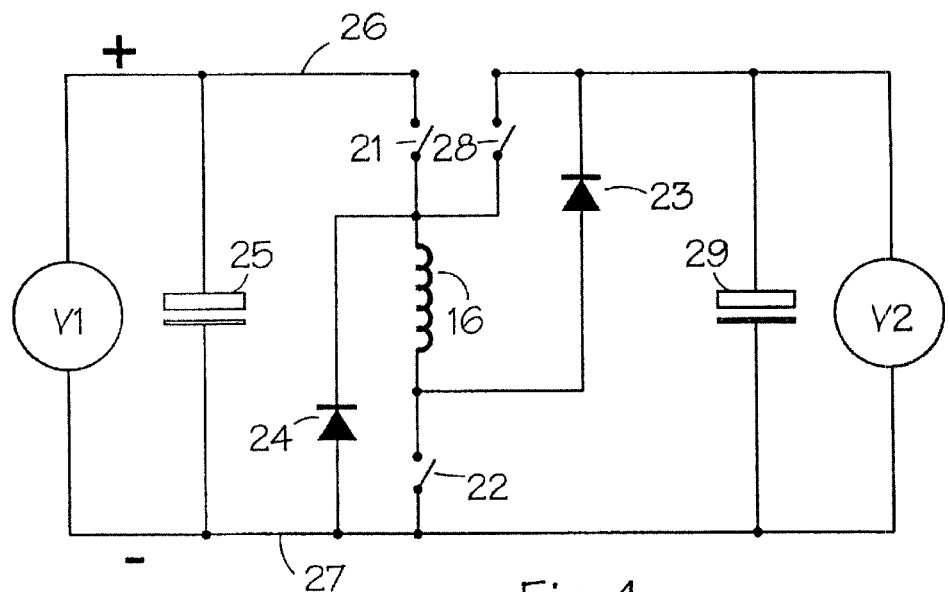
FIG. 4 is a circuit for one phase of a switched reluctance machine, according to an embodiment of the invention.

FIG. 4 shows a first voltage source V1 and a first capacitor 25 connected across a first DC link 26/27 and a second voltage source V2 and a second capacitor 29 connected across a second DC link, the first and second DC links sharing a common negative line 27. Connected to a positive line 26 of the first DC link is a first switch 21 that is connected to the top of a winding 16, which is in turn connected at its lower end to a second switch 22 that is connected to the common negative line. Connected between the top of the winding 16 and the negative line is a diode 24, which is operable to conduct current from the negative line towards the winding 16. Connected between the top of the winding 16 and a positive line of the second DC link is a third switch 28. Between the bottom of the winding 16 and the positive line of the second DC bus is a diode 23 that is connected so as to conduct current from the winding 16 to the second DC bus. In this way, the diode 23 provides an energy return path between the winding 16 and the second voltage source V2.

The machine of FIG. 4 can be operated in an idle mode, at a relatively low speed and drawing small currents, from the first voltage source V1 using the conventional switches 21 and 22. Each time these are opened, the returned current flows into the second source V2 and/or its capacitor 29. Hence, over several operating cycles, the voltage of source V2 rises to some predetermined value, preferably higher than that of V1, typically two or three times higher than V1. At that point the machine can either be switched off or operated in a mode which returns very little energy at the end of the cycle, as will be described below. When the machine is called on to operate at high power, switch 28 is used in place of switch 21, thereby driving the machine from the second, higher voltage source V2. This is done under the control of the electronic control unit 14. When the machine is driven from V2, there is no current drawn from V1 and hence no voltage disturbance on line 26.

While it was stated above that the machine is in an idle mode when it is supplied from V1, it will be appreciated that this need not be the case. For example, the machine could be used to drive a first, relatively low load, while charging up V2. When the load is increased, the machine would then be supplied by V2 and operated so as to drive the increased load. Alternatively, the rotor of the machine could be stationary when the machine is supplied by V1, and V2 is being charged up. In this case, the machine would be operated using a single phase or a plurality of phases simultaneously during the charge up period. When the machine is needed for driving a load, V2 would then be connected so as to supply the machine to drive the load. In any case, the load could be rigidly connected to the rotor of the machine or a clutch could be provided for connecting the rotor to the load as and when desired.

The arrangement of FIG. 4 can be conveniently used in a vehicle for intermittently driving a fan. In this case, the vehicle battery is used as V1 to supply the machine and charge up another source V2, thereby to provide sufficient power to drive the fan. As a specific example for this application, the standard 12V car battery that is provided for supplying the lighting and other ancillary loads is used as V1 and a small additional battery rated at, say, 36V nominal, is used as V2. At an idle speed, say, 15% of rated speed, the machine is supplied by V1. During this stage, when the machine is idling, the battery V2 is charged up by energy that is transferred from the winding 16 to V2. When the fan is required to accelerate to and operate at a high speed, the supply need increases and battery V2 can be switched into operation.

There is a further advantage that is not immediately apparent from FIG. 4. With the conventional circuit, the switches have to be rated to cope with the peak current associated with the maximum power. However, when operated from the higher voltage source V2, there is a corresponding drop in the peak current required for the same power output. This allows switches 22 and 28 to have much smaller current ratings. Since switch 21 is only used in an idle mode, it too can have a small rating. This reduction in switch ratings can be used to offset the cost of the extra switch, capacitor and source.

Figure 5:
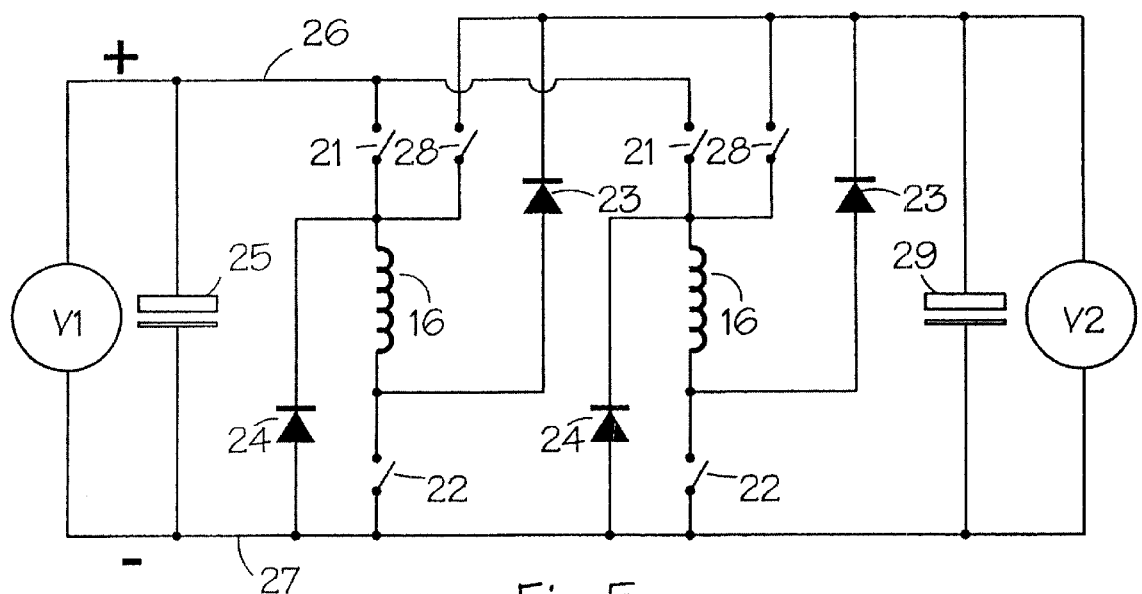
FIG. 5 is a circuit for a polyphase version of the machine of FIG. 4.

While FIG. 4 shows only a single phase, it will be appreciated that the principle of the invention could equally be used in a polyphase configuration. In this case, the circuit would duplicate only the switches, diodes and winding, while the capacitors and voltage sources would be common to all phases. An example of a converter circuit for a two phase machine is shown in FIG. 5.

Figure 6:
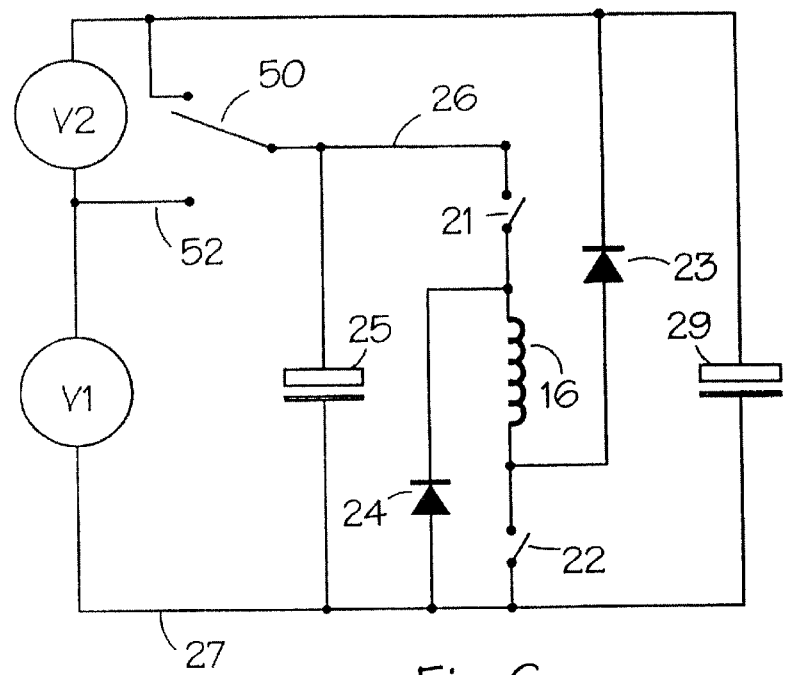
FIG. 6 shows an alternative circuit for a switched reluctance machine, according to an embodiment of the invention.

An alternative circuit for implementing the invention is shown in FIG. 6. In this case, the circuit has first and second voltage sources V1 and V2 that are connected in series. Between the two sources V1 and V2 is an output terminal 52, so that the voltage used by the machine can either be the output of V1 or the combined output of V1 and V2. To toggle between the two outputs, a change-over switch 50 is provided. Connected between the switch 50 and a negative end of the DC bus is a capacitor 25. In parallel with capacitor 25 is a series combination of a first switch 21, a winding 16 and a second switch 22, in that order. Connected between the first switch 21 and the winding 16 is one end of a diode 24, which is connected at its other end to the negative line of the DC bus, the diode 24 being such as to conduct current from the negative line 27 to the top of the winding 16.

Connected between the second switch 22 and the lower end of the winding 16 is one end of a diode 23, which is connected at its other end to the positive end of the second voltage source V2, so as to conduct current from the winding 16 to the second voltage source V2. In this way, an energy return path is provided between the winding 16 and the second voltage source V2. Connected between the upper end of diode 23 and the lower DC link is a capacitor 29, which is in effect connected across both the first and second voltage sources.

Figure 1:
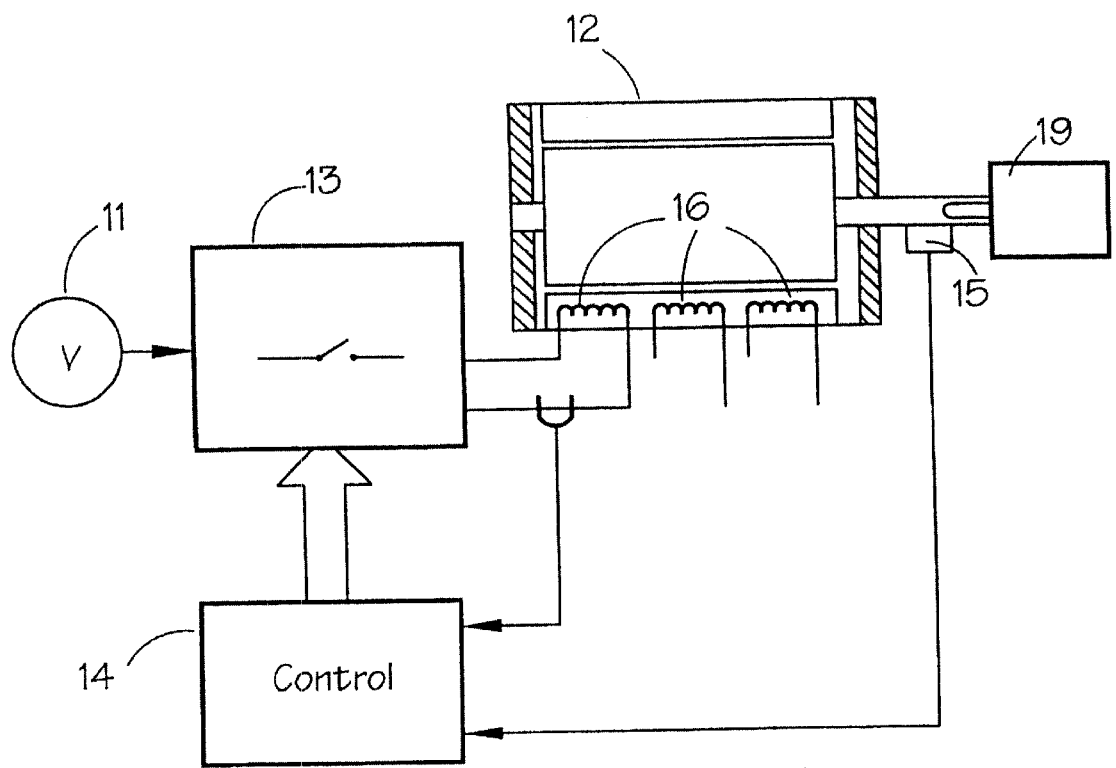
FIG. 1 shows a schematic diagram of a known switched reluctance system.
Figure 2:
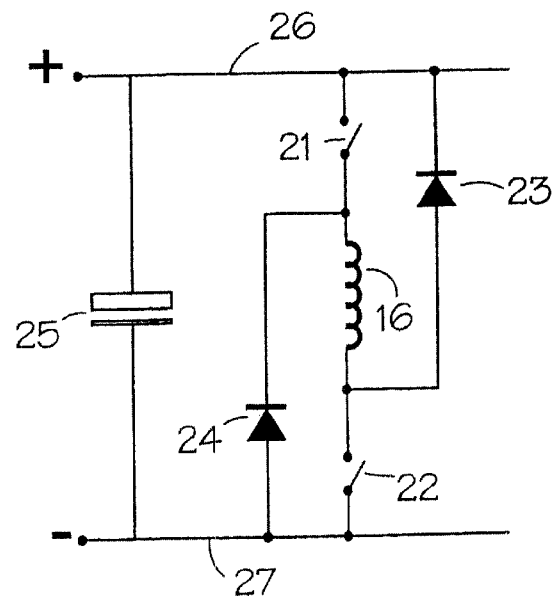
FIG. 2 shows the connection of one phase winding to a power converter.
Figures 3A, 3B, 3C:
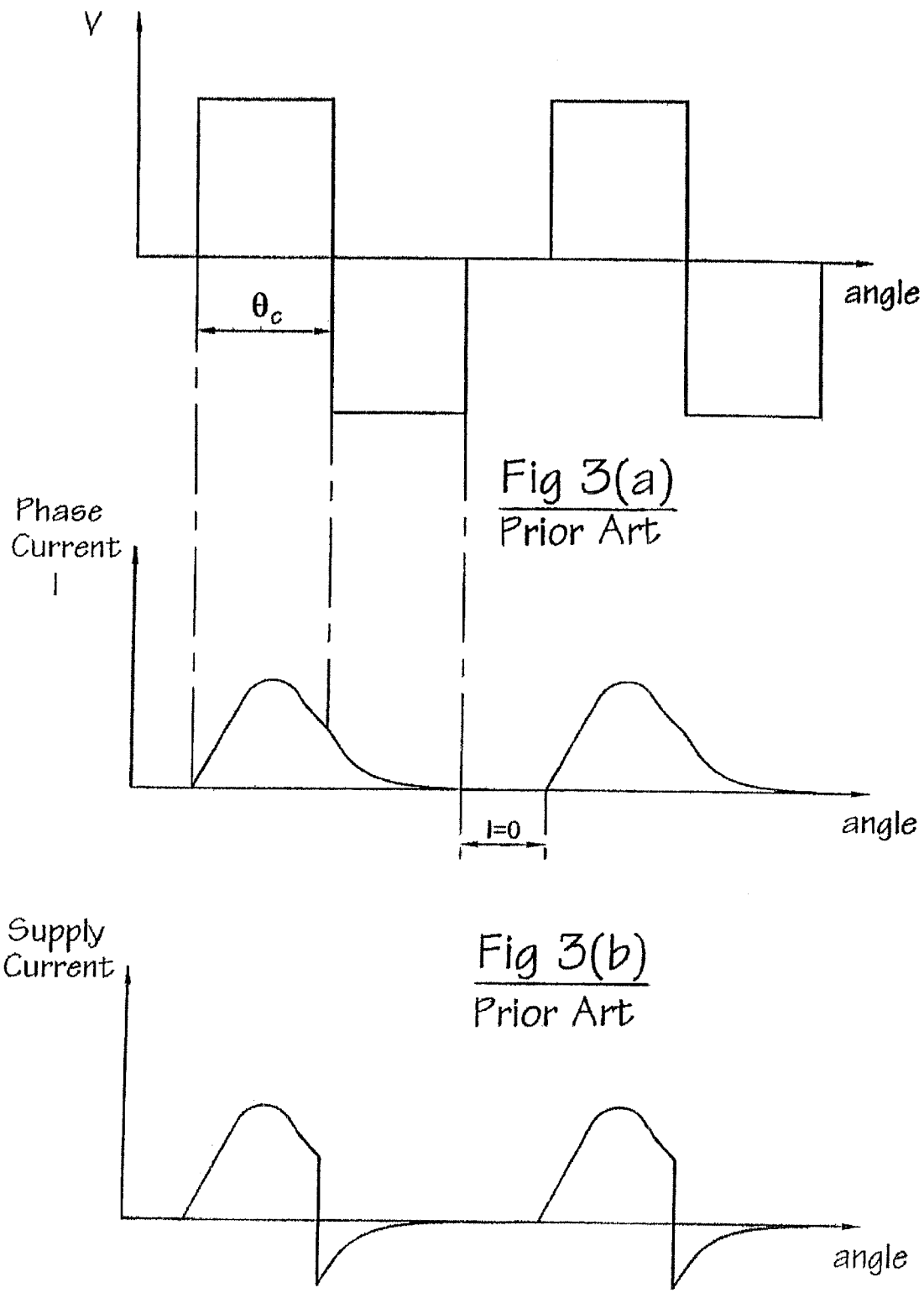
FIG. 3(*a*) shows a typical voltage waveform applied to the phase winding of FIG. 2.

The machine of FIG. 6 can be operated at a relatively low speed, or in a stationary mode as previously mentioned, so as to draw small currents from the first voltage source V1 by using the change-over switch 50 to connect V1 across the machine and using the conventional switches 21 and 22. Each time the conventional switches are opened, the returned current flows into the second source V2 and/or its capacitor 29 via diode 23. Hence, over several operating cycles, the voltage of source V2 rises to some predetermined value, which may be higher than that of V1. When the machine is called on to operate at high power, the change-over switch 50 is toggled to connect the combined output of V1 and V2 across the winding 16, thereby driving the machine from the higher combined voltage. In the context of a vehicle, the decision to toggle the switch 50 will be made by a conventional engine management system according to the demand on the vehicle. In other situations corresponding control means can be used to equal effect and can be incorporated in the control 14 of FIG. 1, for example.

It should be noted that, for the circuit of FIG. 6, the source V1 has to supply current to the winding 16 when operating the machine at both of the low and high voltages, albeit this is much smaller than the current which would be required for the peak power at low voltage.

Figure 7:
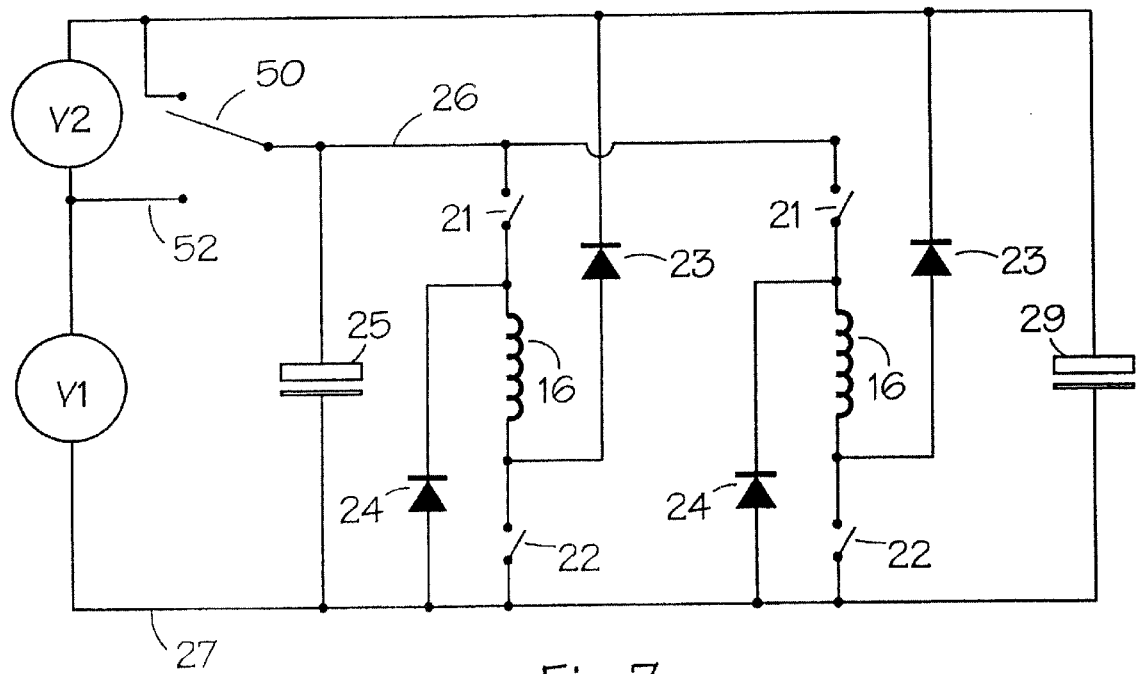
FIG. 7 is a circuit for a polyphase version of the machine of FIG. 6.

FIG. 6 shows only a single phase, but it will be appreciated that the principle could be used in a polyphase configuration. In this case, the circuit would duplicate only the switches, diodes and winding while the capacitors and voltage sources would be common to all phases. An example of a converter circuit for a two phase machine is shown in FIG. 7.

Figure 8:
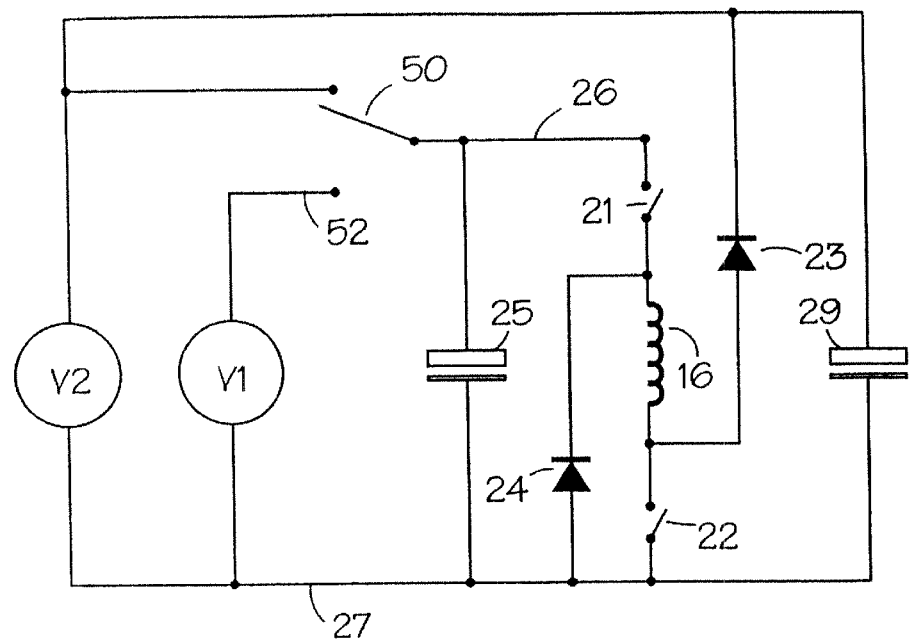
FIG. 8 shows a modification of the circuit of FIG. 6.

FIG. 8 shows another system in which the invention is embodied. This is similar to the arrangement of FIGS. 6 and 7, except the first and second voltage sources V1 and V2, respectively, are arranged in parallel. This arrangement, however, allows independent operation of the two voltage sources, so that the lower voltage source V1 does not have to supply extra current when the machine is operated at full power.

Figure 9:
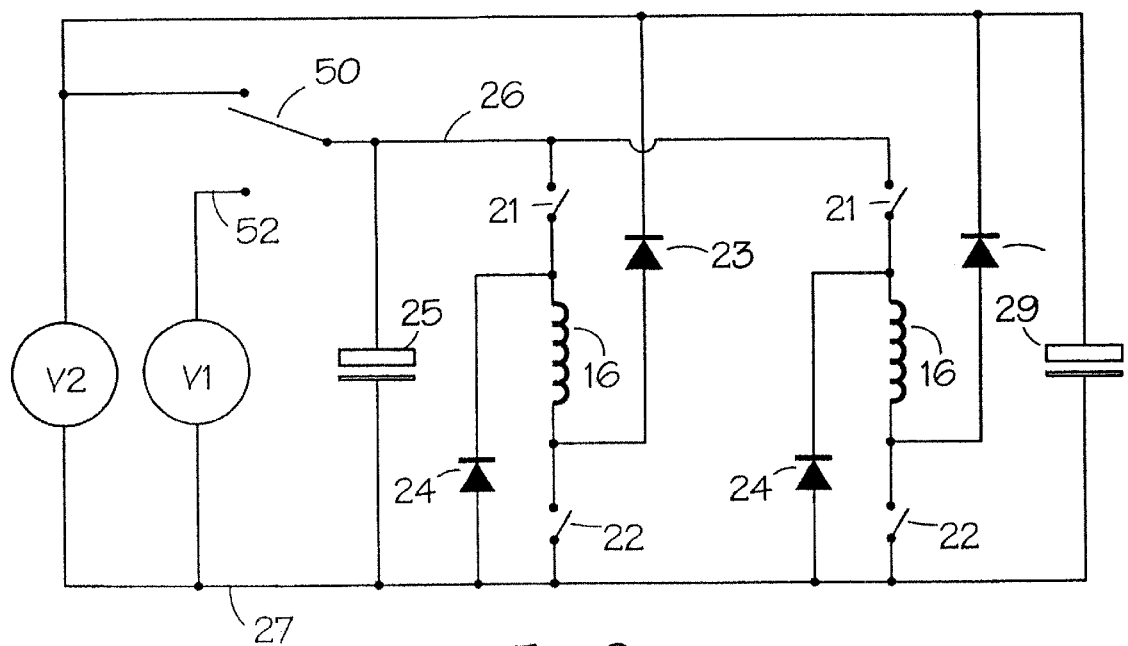
FIG. 9 is a circuit for a polyphase version of the machine of FIG. 8.

FIG. 8 shows only a single phase, but it will be appreciated that the principle could be used in a polyphase configuration. In this case, the circuit would duplicate only the switches, diodes and winding while the capacitors and voltage sources would be common to all phases, as shown in FIG. 9. With the arrangements shown in FIGS. 6 to 9, only one change-over switch 50 is required, regardless of the number of phases in the machine.

With the arrangements shown in FIGS. 6 to 9, the capacitor 25 is suddenly exposed to a change in voltage when the changeover switch 50 is operated, potentially causing stress to the capacitor and switch and/or disturbance to the voltage sources. This problem can be avoided by moving the top connection of the capacitor 25 to the terminal 52. This may make the connection of the capacitor physically remote from the switches 21 and 22, introducing unwanted stray inductance into the switching path. This may be addressed by dividing the capacitor 25 into two or more elements: a larger capacitor attached to terminal 52 and sized to cope with lower frequency components, and one or more smaller capacitors connected close to the switches, sized to absorb only the higher frequency components, and having a much smaller impact on the circuit when the switch is operated.

V1 of the above examples may be any suitable power supply such as a battery. V2 could be any suitable device for electrical storage, for example, a battery or a capacitor or an ultra-capacitor.

Those skilled in the art will readily appreciate that, while the circuits shown in FIGS. 4–9 use a common negative rail, it would be a matter of routine to reconfigure them to have a common positive rail, to equal effect.

With each of the circuits described above, it is possible to regulate the amount of power being transferred to the high voltage source to charge it. In some applications it may be possible to run the machine as a generator, in which case conventional switched reluctance machine control can be used, generating into the high voltage source and drawing excitation from the lower voltage source. However, in most situations it will not be possible to use the machine as a generator as there will be no source of mechanical power. Nevertheless it is still possible to efficiently charge the higher voltage source from the lower voltage source by the use of the technique described above. The technique is based on the recognition that the amount of energy that can be recovered at the point of switch-off is closely related to that stored in the magnetic field of the machine. Since the switching angles are under the control of the user, appropriate angles can be chosen to vary the amount of stored energy in the machine and hence the amount recovered to electrical power. In general, "later" angles than would conventionally be used for peak motoring efficiency will recover more energy.

When the source V2 is charged to the desired level (which can be detected by voltage monitoring or by integrating the amount of charge sent to it), it is appropriate to modify the switching strategy to use angles which allow the machine to run but are associated with very little stored energy at switch-off. One method of doing this is to use a relatively short conduction angle (probably quite early in the cycle) followed by a long period of freewheeling. This allows the flux to be forced down by the voltage drops across the winding and the devices. Alternatively, the machine could simply be switched off or could be run from V2 for a short time to reduce the stored energy.

Embodiments of this invention provide a circuit and method of operation that allow a switched reluctance machine to operate as a motor in an idle mode on a limited capacity, low-voltage bus, while charging a high voltage source. The high voltage source can subsequently be used to operate the machine at high power for a short time with little or no disturbance to the low-voltage bus. This is advantageous.

A further use of the invention is to provide a high power mode for emergency operation of a conventional drive system, whether battery or mains supplied.

The skilled person will appreciate that variations of the disclosed arrangements are possible without departing from the invention. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

What is claimed is:

1. A switched reluctance drive comprising:
   a rotor,
   a stator having a winding, and
   a controller having means for selectively connecting either of a first and a second voltage source to supply the winding, and an energy return path between the winding and the second voltage source to allow energy to be transferred from the winding to the second voltage source when the first voltage source is used to supply the winding, thereby to charge the second voltage source.

2. A switched reluctance drive as claimed in claim 1, wherein the second voltage source is charged up to a predetermined value, preferably greater than that of the first voltage source, for example, two or three times that of the first voltage source.

3. A switched reluctance drive as claimed in claim 1, wherein the first and second voltage sources are arranged in series.

4. A switched reluctance drive as claimed in claim 1, wherein the first and second voltage sources are arranged in parallel.

5. A switched reluctance drive as claimed in claim 1, wherein the first and second voltage sources each include a capacitor connected across it in parallel.

6. A switched reluctance drive as claimed in claim 1, wherein the energy return path comprises a diode that is connected between one end of the winding and the second voltage source in such a way as to transfer energy from the winding to the second voltage source.

7. A switched reluctance drive as claimed in claim 1, wherein the means for selectively connecting either of the first and the second voltage sources to supply the winding comprises a first switch and a second switch that are arranged in parallel, the first switch being connected in use between the winding and the first voltage source and the second switch being connected in use between the winding and the second voltage source, so that when the first switch is opened and the second switch is closed, the second voltage source is used to supply the winding.

8. A switched reluctance drive as claimed in claim 7, wherein a third switch is provided for connecting the winding to a common terminal of both of the first and second voltage sources.

9. A switched reluctance drive as claimed in claim 7, in which the means for selectively connecting further comprises a control means for actuating the first, second or third switch.

10. A switched reluctance drive as claimed in claim 1, wherein the means for selectively connecting either of the first and/or the second voltage sources to supply the winding comprises a change-over switch that is operable in one position to connect the first voltage source to supply the winding and in another position to connect the second voltage source to supply the winding.

11. A switched reluctance drive as claimed in claim 10, wherein the winding is connected between and in series with a pair of switches.

12. A switched reluctance drive as claimed in claim 1, further comprising a detector for detecting when the second voltage source is charged to a predetermined level.

13. A switched reluctance drive as claimed in claim 12, further comprising means for modifying operation of the drive to reduce the energy transferred to the second voltage source, when the second voltage source is charged to the predetermined level.

14. A switched reluctance drive as claimed in claim 1, wherein the drive is a polyphase drive.

15. A method of operating a switched reluctance drive comprising a rotor and a stator having a winding, the method comprising:
   connecting a first voltage source to the drive so as to supply the winding;

switching the first voltage source on and off across the winding;

transferring energy from the winding to a second voltage source when the first voltage source is switched off, thereby to charge the second voltage source, and selectively connecting the second voltage source so as to supply the winding.

16. A method as claimed in claim 15, wherein the second voltage source is charged up to a predetermined value higher than the voltage rating of the first voltage source.

17. A method as claimed in claim 16, wherein the predetermined value is two or three times that of the first voltage source.

18. A method as claimed in claim 15, wherein the first and second voltage sources are arranged in series.

19. A method as claimed in claim 15, wherein the first and second voltage sources are arranged in parallel.

20. A method as claimed in claim 15, wherein the first and second voltage sources each include a capacitor connected across it in parallel.

21. A method as claimed in claim 15, wherein the step of transferring involves directing energy from the winding to the second voltage source via an energy return path that comprises a diode that is connected between one end of the winding and the second voltage source in such a way as to transfer energy from the winding to the second voltage source.

22. A method as claimed in claim 15, wherein the winding is connected in series with and between a pair of switches and the step of switching involves switching the pair of switches between open and closed positions.

23. A method as claimed in claim 15, comprising detecting when the second voltage source is charged to a predetermined level.

24. A method as claimed in claim 23, comprising modifying the step of switching to reduce the energy transferred to the second voltage source when it is charged to a predetermined level.

* * * * *